(12) United States Patent
Yang et al.

(10) Patent No.: US 11,467,758 B2
(45) Date of Patent: Oct. 11, 2022

(54) DATA WRITING METHOD USING DIFFERENT PROGRAMMING MODES BASED ON THE NUMBER OF AVAILABLE PHYSICAL ERASING UNITS, MEMORY CONTROL CIRCUIT UNIT AND MEMORY STORAGE DEVICE

(71) Applicant: PHISON ELECTRONICS CORP., Miaoli (TW)

(72) Inventors: Chieh Yang, Taipei (TW); Yi-Hsuan Lin, New Taipei (TW); Tai-Yuan Huang, New Taipei (TW); Ping-Chuan Lin, Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 409 days.

(21) Appl. No.: 16/425,942

(22) Filed: May 29, 2019

(65) Prior Publication Data
US 2020/0341676 A1 Oct. 29, 2020

(30) Foreign Application Priority Data
Apr. 23, 2019 (TW) .................................. 108114202

(51) Int. Cl.
*G06F 12/00* (2006.01)
*G06F 3/06* (2006.01)
*G06F 12/02* (2006.01)

(52) U.S. Cl.
CPC .......... *G06F 3/0652* (2013.01); *G06F 3/0608* (2013.01); *G06F 3/0658* (2013.01); *G06F 3/0673* (2013.01); *G06F 12/023* (2013.01); *G06F 12/0253* (2013.01)

(58) Field of Classification Search
CPC .... G06F 3/0652; G06F 3/0608; G06F 3/0658; G06F 3/0673; G06F 12/023; G06F 12/0253; G06F 12/02
See application file for complete search history.

(56) References Cited

U.S. PATENT DOCUMENTS

| 10,310,739 | B2 * | 6/2019 | Chen ........................ G06F 3/061 |
| 2010/0122016 | A1 * | 5/2010 | Marotta .................. G11C 16/16 711/103 |
| 2016/0062663 | A1 * | 3/2016 | Samuels ............. G11C 11/5621 711/103 |
| 2019/0018598 | A1 * | 1/2019 | Hung .................... G06F 3/0652 |

* cited by examiner

*Primary Examiner* — Reginald G Bragdon
*Assistant Examiner* — Michael L Westbrook
(74) *Attorney, Agent, or Firm* — JCIPRNET

(57) ABSTRACT

A data writing method, a memory control circuit unit, and a memory storage device are provided. The method includes: receiving a first write command from a host system; selecting a first physical erasing unit from at least one physical erasing unit available for writing and writing data corresponding to the first write command to the first physical erasing unit by using a single page programming mode or a multi-page programming mode when the number of physical erasing units available for writing is greater than a first threshold; and selecting a second physical erasing unit from the at least one physical erasing unit available for writing and writing data corresponding to the first write command into the second physical erasing unit by only using the single page programming mode when the number of physical erasing units available for writing is not greater than the first threshold.

21 Claims, 9 Drawing Sheets

DATA WRITING METHOD USING DIFFERENT PROGRAMMING MODES BASED ON THE NUMBER OF AVAILABLE PHYSICAL ERASING UNITS, MEMORY CONTROL CIRCUIT UNIT AND MEMORY STORAGE DEVICE

CROSS-REFERENCE TO RELATED APPLICATION

This application claims the priority benefit of Taiwan application serial no. 108114202, filed on Apr. 23, 2019. The entirety of the above-mentioned patent application is hereby incorporated by reference herein and made a part of this specification.

BACKGROUND

Technical Field

The present invention relates to a data writing method, a memory control circuit unit and a memory storage device.

Description of Related Art

The growth of digital cameras, mobile phones, and MP3 players has been rapid in recent years. Consequently, the consumers' demand for storage media has increased tremendously. With characteristics including data non-volatility, energy saving, small size, lack of mechanical structures, high reading/writing speed, etc., rewritable non-volatile memories are most suitable for portable electronic products, such as laptops. A solid state drive is a memory storage device which utilizes a flash memory as its storage medium. For these reasons, flash memory has become an important part of the electronic industries.

In general, a rewritable non-volatile memory has multiple physical erasing units, and each physical erasing units has multiple physical programming units. A physical programming unit is usually constituted by multiple memory cells. The memory management circuit can use a single page programming mode or a multi-page programming mode to program (or write) data to the physical erasing unit. Here, the programming speed of programming the memory cell based on the single page programming mode is higher than the programming speed of programming the memory cell based on the multi-page programming mode (i.e., the time required for programming data by using the multi-page programming mode is greater than the time required for programming data by using the single page programming mode). Wherein each of the memory cells in the physical programming unit written in the single page programming mode stores only one bit of data, and each of the memory cells in the physical programming unit written in the multi-page programming mode stores multiple bits of data.

In particular, when the memory management circuit performs write operations to a physical erasing unit, it is assumed that an abnormal power-off occurs at this time. After the rewritable non-volatile memory module is powered on again, the memory management circuit needs to perform an error recovery mechanism. It is assumed that the memory management circuit uses the multi-page programming mode to write data to a physical erasing unit before power-off. After the rewritable non-volatile memory module is powered back on, the memory management circuit would move (or copy) the valid data in the physical erasing unit that is being written in the multi-page programming mode before the power-off to another physical erasing unit. However, moving (or copying) data written in a multi-page programming mode to another physical erasing unit by using the multi-page programming mode is quite time consuming.

In addition, the aforementioned error recovery mechanism can also be accomplished by a valid data merging operation. For example, it is assumed that the memory management circuit uses the multi-page programming mode to write data to a physical erasing unit before power-off. After the rewritable non-volatile memory module is powered back on, the memory management circuit will determine whether to perform the valid data merging operation (a.k.a. garbage collection operation) at an appropriate timing. For example, when the number of physical erasing units available for writing in the rewritable non-volatile memory module is insufficient, the memory management circuit can perform the valid data merging operation to move (or copy) the valid data in the physical erasing unit previously written in the multi-page programming mode before power-off into another physical erasing unit by using the multi-page programming mode, thereby increasing the number of physical erasing units available for writing in the rewritable non-volatile memory module and completing the error recovery mechanism performed due to the power-off. Similarly, moving (or copying) data written in multi-page programming mode to another physical erasing unit by using the multi-page programming mode is quite time consuming.

Therefore, when the rewritable non-volatile memory module is abnormally powered off, how to quickly perform the error recovery mechanism after power-on is one of the problems required to be solved by those skilled in the art.

SUMMARY

The disclosure provides a data writing method, a memory control circuit unit and a memory storage device, which can perform an error recovery mechanism quickly in response to an abnormal power-off of the rewritable non-volatile memory module after the power is back on.

The disclosure provides a data writing method for a rewritable non-volatile memory module, wherein the rewritable non-volatile memory module comprises a plurality of physical erasing units, each of the plurality of physical erasing units comprises a plurality of physical programming units, the data writing method comprising: receiving a first write command from a host system; determining whether the number of at least one physical erasing unit available for writing in the plurality of physical erasing units is greater than a first threshold; when the number of the at least one physical erasing unit available for writing in the plurality of physical erasing units is greater than the first threshold, selecting a first physical erasing unit from the at least one physical erasing unit available for writing and writing data corresponding to the first write command to at least one first physical programming unit of the first physical erasing unit by using a single page programming mode or a multi-page programming mode; and when the number of the at least one physical erasing unit available for writing in the plurality of physical erasing units is not greater than the first threshold, selecting a second physical erasing unit from the at least one physical erasing unit available for writing and writing the data corresponding to the first write command to at least one second physical programming unit of the second physical erasing unit by only using the single page programming mode.

The disclosure provides a memory control circuit unit for controlling a rewritable non-volatile memory module, the memory control circuit unit comprising: a host interface, a memory interface and a memory management circuit. The host interface is configured to couple to the host system. The memory interface is configured to couple to the rewritable non-volatile memory module, wherein the rewritable non-volatile memory module comprises a plurality of physical erasing units, and each of the physical erasing units comprises a plurality of physical programming units. The memory management circuit is coupled to the host interface and the memory interface and configured to perform the following operations: receiving a first write command from the host system; determining whether the number of at least one physical erasing unit available for writing in the plurality of physical erasing units is greater than a first threshold; when the number of the at least one physical erasing unit available for writing in the plurality of physical erasing units is greater than the first threshold, selecting a first physical erasing unit from the at least one physical erasing unit available for writing and writing data corresponding to the first write command to at least one first physical programming unit of the first physical erasing unit by using a single page programming mode or a multi-page programming mode; and when the number of the at least one physical erasing unit available for writing in the plurality of physical erasing units is not greater than the first threshold, selecting a second physical erasing unit from the at least one physical erasing unit available for writing and writing the data corresponding to the first write command to at least one second physical programming unit of the second physical erasing unit by only using the single page programming mode.

The disclosure provides a memory storage device comprising: a connection interface unit, a rewritable non-volatile memory module and a memory control circuit unit. The connection interface unit is configured to couple to a host system. The rewritable non-volatile memory module comprises a plurality of physical erasing units, and each of the physical erasing units comprises a plurality of physical programming units. The memory control circuit unit is coupled to the connection interface unit and the rewritable non-volatile memory module and configured to perform the following operations: receiving a first write command from the host system; determining whether the number of at least one physical erasing unit available for writing in the plurality of physical erasing units is greater than a first threshold; when the number of the at least one physical erasing unit available for writing in the plurality of physical erasing units is greater than the first threshold, selecting a first physical erasing unit from the at least one physical erasing unit available for writing and writing data corresponding to the first write command to at least one first physical programming unit of the first physical erasing unit by using a single page programming mode or a multi-page programming mode; and when the number of the at least one physical erasing unit available for writing in the plurality of physical erasing units is not greater than the first threshold, selecting a second physical erasing unit from the at least one physical erasing unit available for writing and writing the data corresponding to the first write command to at least one second physical programming unit of the second physical erasing unit by only using the single page programming mode.

Accordingly, the data writing method, the memory control circuit unit, and the memory storage device of the present disclosure can perform the error recovery mechanism quickly in response to an abnormal power-off of the rewritable non-volatile memory module after the power is back on.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
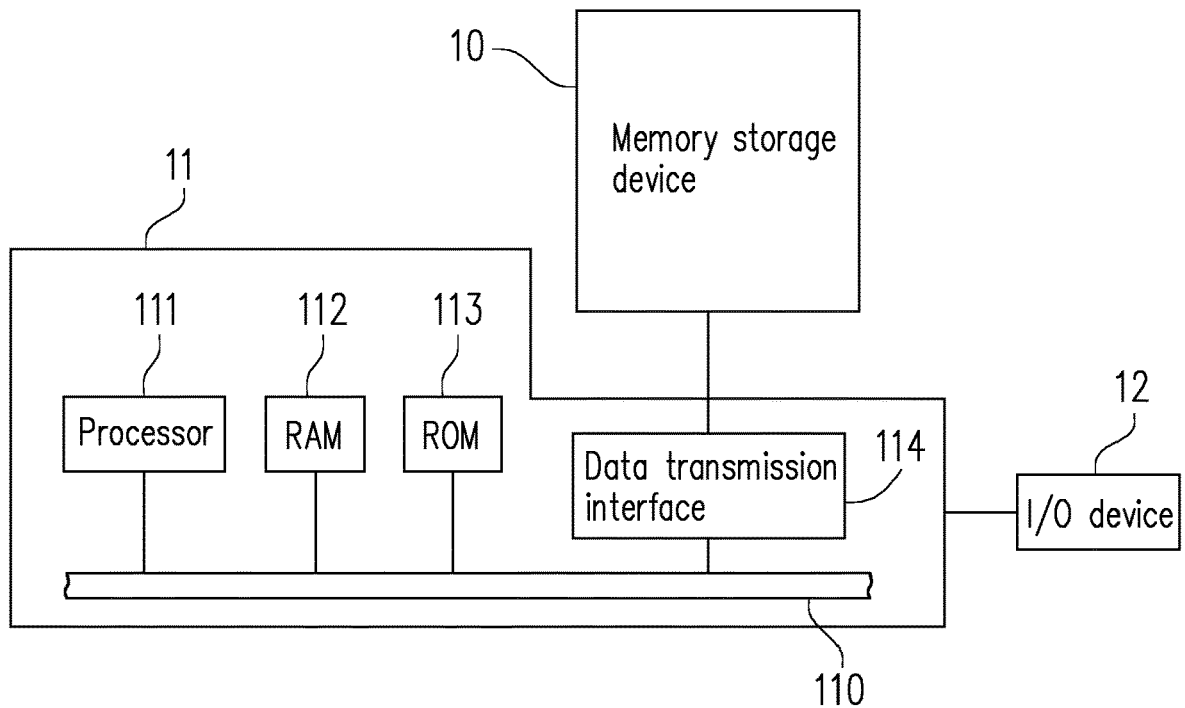
FIG. 1 is a schematic diagram illustrating a host system, a memory storage device and an I/O (input/output) device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 2:
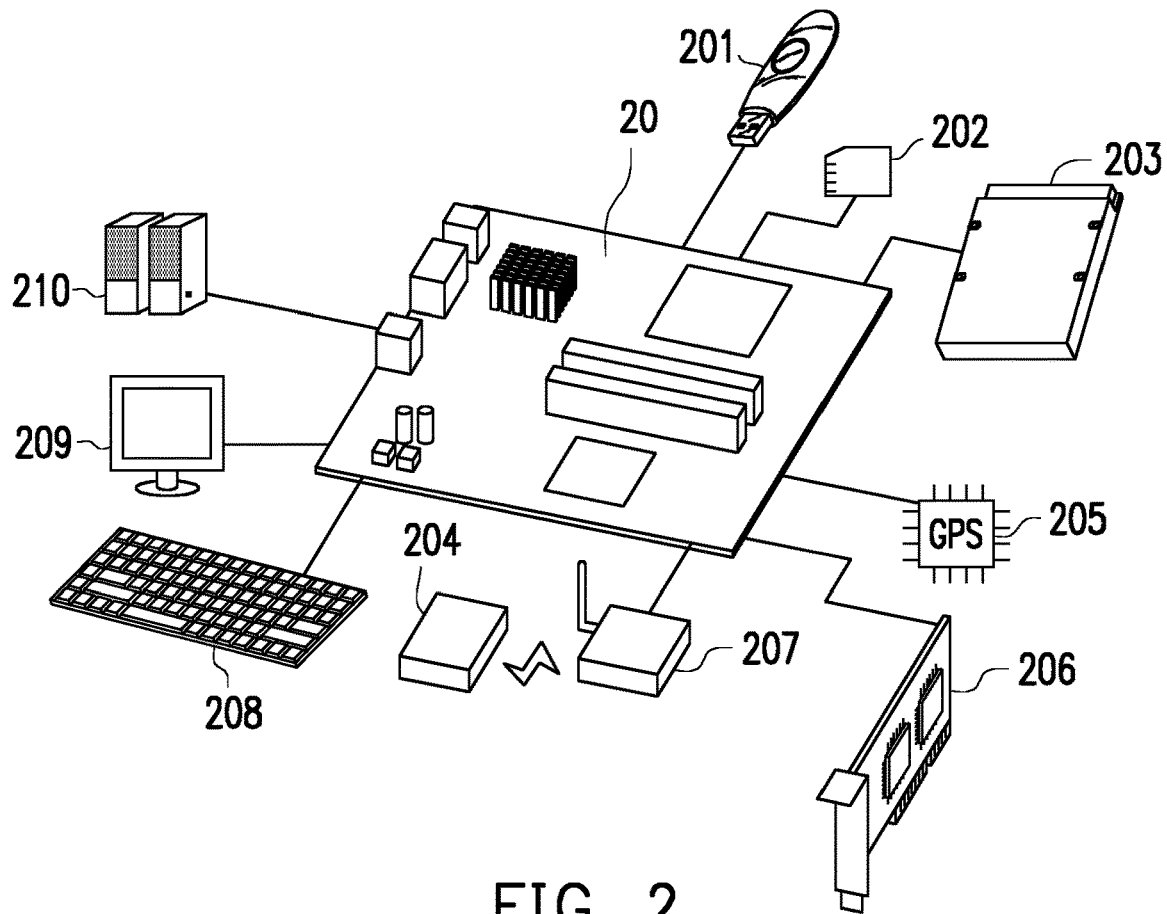
FIG. 2 is a schematic diagram illustrating a host system, a memory storage device and an I/O device according to another exemplary embodiment of the invention.

FIG. 1 is a schematic diagram illustrating a host system, a memory storage device and an I/O (input/output) device according to an exemplary embodiment of the invention. FIG. 2 is a schematic diagram illustrating a host system, a memory storage device and an I/O device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can store data into the memory storage device 10 or read data from the memory storage device 10 through the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC(Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
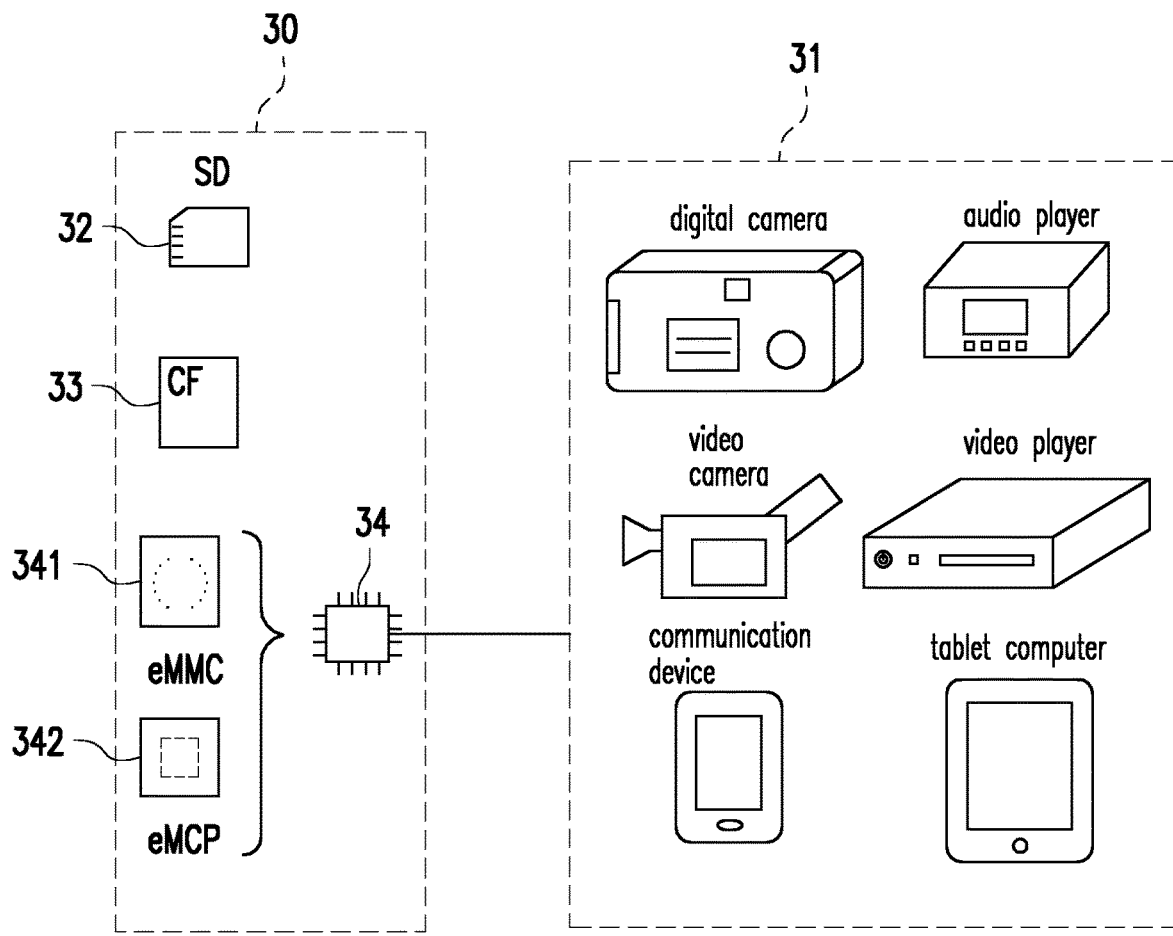
FIG. 3 is a schematic diagram illustrating a host system and a memory storage device according to another exemplary embodiment of the invention.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the invention. Referring to FIG. 3, in another exemplary embodiment, a host system 31 may also be a system including a digital camera, a video camera, a communication device, an audio player, a video player or a tablet computer, and a memory storage device 30 may be various non-volatile memory storage devices used by the host system, such as a SD card 32, a CF card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) 342.

Figure 4:
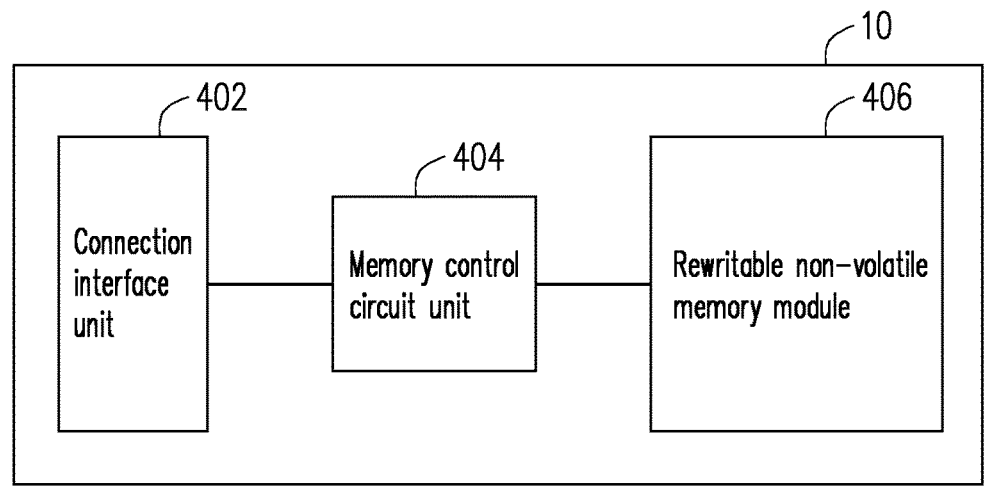
FIG. 4 is a schematic block diagram illustrating a memory storage device according to an exemplary embodiment of the invention.

FIG. 4 is a schematic block diagram illustrating a memory storage device according to an exemplary embodiment of the invention.

Referring to FIG. 4, the memory storage device 10 includes a connection interface unit 402, a memory control circuit unit 404 and a rewritable non-volatile memory module 406.

In this embodiment, the connection interface unit 402 is compatible with a SATA (Serial Advanced Technology Attachment) standard. Nevertheless, it should be understood that the invention is not limited in this regard. The connection interface unit 402 may also be compatible to a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD (Secure Digital) interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a CF (Compact Flash) interface standard, an IDE (Integrated Device Electronics) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware from or in a firmware from and perform operations of writing, reading or erasing data in the rewritable non-volatile memory module 406 according to the commands of the host system 11.

The rewritable non-volatile memory module 406 is coupled to the memory control circuit unit 404 and configured to store data written from the host system 11. The rewritable non-volatile memory module 406 has physical erasing units 510(0) to 510(N). For instance, the physical erasing units 510(0) to 510(N) may belong to the same memory die or belong to different memory dies. Each physical erasing unit has a plurality of physical programming units. For example, in the present exemplary embodiment, each physical erasing unit contains 258 physical programming units, and physical programming units belonging to the same physical erasing unit may be written independently and erased simultaneously. However, it is to be understood that the present invention is not limited thereto, and each physical erasing unit may contain 64 physical programming units, 256 physical programming units or any number of physical programming units.

To be more detailed, a physical erasing unit is the smallest is the smallest unit for erasing data, namely, each physical erasing unit contains the least number of memory cells that are erased all together. A physical programming unit is the smallest unit for programming data, namely, each physical programming unit is the smallest unit for writing data. Each physical programming unit commonly includes a data bit area and a redundant bit area, and the data bit area includes a plurality of physical access addresses for storing data of users, and the redundant bit area is configured for storing system data (e.g., control information and error correcting codes). In the present exemplary embodiment, each data bit area of the physical programming units contains 4 physical access addresses, and the size of each physical access address is 512 bytes. However, in other exemplary embodiments, more or less number of the physical access addresses may be contained in the data bit area, and the amount and the size of the physical access addresses are not limited in the present invention.

In the present exemplary embodiment, the rewritable non-volatile memory module 406 is a trinary-level cell (TLC) NAND flash memory module (i.e., a flash memory module capable of storing data of 3 bits in one memory cell). However, the present invention is not limited thereto, and the rewritable non-volatile memory module 406 may also be a multi-level cell (MLC) NAND flash memory module (i.e., a flash memory module capable of storing data of 2 bits in one memory cell), other flash memory modules, or other memory modules having the same characteristics.

Figure 5A:
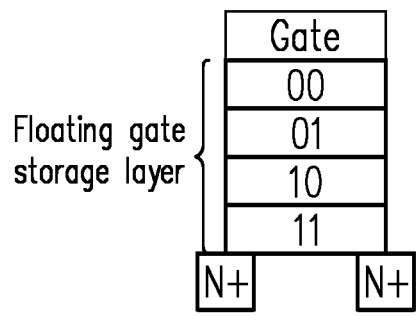
FIG. 5A and FIG. 5B are exemplary schematic diagrams illustrating examples of a memory cell storage structure and a physical erasing unit according to an exemplary embodiment of the present invention.
Figure 5B:
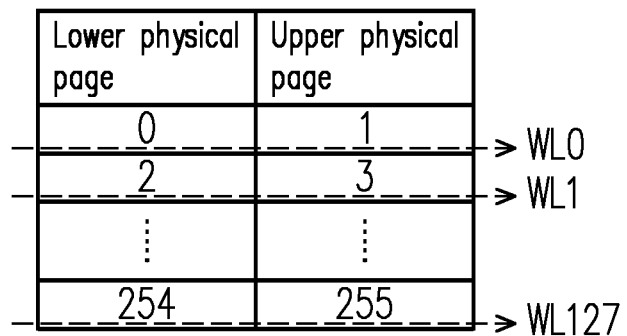

FIG. 5A and FIG. 5B are exemplary schematic diagrams illustrating examples of a memory cell storage structure and a physical erasing unit according to an exemplary embodiment of the present invention. In the present exemplary embodiment, an MLC NAND flash memory is illustrated as an example for description.

Referring to FIG. 5A, each memory cell in the rewritable non-volatile memory module 406 is capable of storing two bits of data, and a storage state of each memory cell can be identified as "11", "10", "01", or "00". In which, each storage state includes the least significant bit (LSB) and the most significant bit (MSB). For example, in the storage state, the value of the first bit counted from the left is the LSB, and the value of the second bit counted from the left is the MSB. Accordingly, the memory cells connected to the same word line may constitute two physical programming units, in which the physical programming unit constituted by the LSBs of the memory cells is referred to as a lower physical programming unit, and the physical programming unit constituted by the MSBs of the memory cells is referred to as an upper physical programming unit.

Referring to FIG. 5B, a physical erasing unit is constituted by a plurality of physical programming unit groups, and each physical programming unit group includes the lower physical programming unit and the upper physical programming unit constituted by the memory cells arranged on the same word line. For example, in the physical erasing unit, a $0^{th}$ physical programming unit belonging to the lower physical programming unit and a $1^{st}$ physical programming unit belonging to the upper physical programming unit are constituted by the memory cells arranged on word line WL0, therefore being regarded as one physical programming unit group. Similarly, the $2^{nd}$ and $3^{rd}$ physical programming units are constituted by the memory cells arranged on word line WL1, therefore being regarded as one physical programming unit group, and the other physical programming units are grouped to a plurality of physical programming unit groups in the same way.

Figure 6:
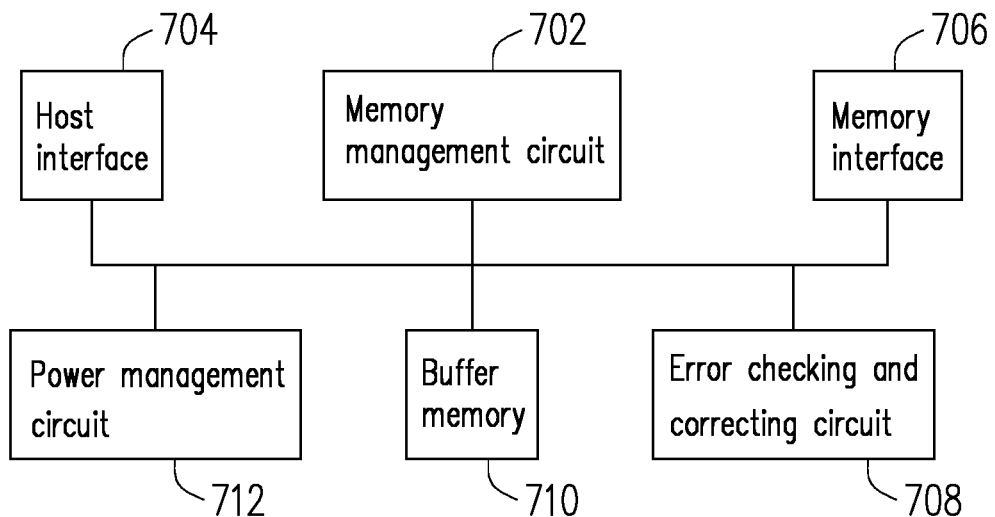
FIG. 6 is a schematic block diagram illustrating a memory control circuit unit according to an exemplary embodiment of the invention.

FIG. 6 is a schematic block diagram illustrating a memory control circuit unit according to an exemplary embodiment of the invention.

Referring to FIG. 6, the memory control circuit unit 404 includes a memory management circuit 702, a host interface 704, a memory interface 706 and an error check and correction circuit 708.

The memory management circuit 702 is configured to control overall operations of the memory control circuit unit 404. Specifically, the memory management circuit 702 has a plurality of control commands. When the memory storage device 10 operates, the control commands are executed to perform various operations such as data writing, data reading and data erasing. Hereinafter, description regarding operations of the memory management circuit 702 or any circuit element in the memory control circuit unit 404 is equivalent to description regarding operations of the memory control circuit unit 404.

In this exemplary embodiment, the control commands of the memory management circuit 702 are implemented in form of firmware. For instance, the memory management circuit 702 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the memory management circuit 702 may also be stored as program codes in a specific area (for example, the system area in a memory exclusively used for storing system data) of the rewritable non-volatile memory module 406. In addition, the memory management circuit 702 has a microprocessor unit (not illustrated), the read only memory (not illustrated) and a random access memory (not illustrated). More particularly, the ROM has a boot code, which is executed by the microprocessor unit to load the control commands stored in the rewritable non-volatile memory module 406 to the RAM of the memory management circuit 702 when the memory control circuit unit 404 is enabled. Then, the control commands are executed by the microprocessor unit to perform operations, such as writing, reading or erasing data.

Further, in another exemplary embodiment, the control commands of the memory management circuit 702 may also be implemented in form of hardware. For example, the memory management circuit 702 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to give a write command sequence for the rewritable non-volatile memory module 406 in order to write data into the rewritable non-volatile memory module 406. The memory reading circuit is configured to give a read command sequence for the rewritable non-volatile memory module 406 in order to read data from the rewritable non-volatile memory module 406. The memory erasing circuit is configured to give an erase command sequence for the rewritable non-volatile memory module 406 in order to erase data from the rewritable non-volatile memory module 406. The data processing circuit is configured to process both the data to be written into the rewritable non-volatile memory module 406 and the data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 702 may further give command sequence of other types to the rewritable non-volatile memory module 406 for instructing to perform the corresponding operations.

The host interface 704 is coupled to the memory management circuit 702 and configured to receive and identify commands and data sent from the host system 11. In other words, the commands and data transmitted by the host system 11 are transmitted to the memory management circuit 702 via the host interface 704. In this exemplary embodiment, the host interface 704 is compatible with the SATA standard. Nevertheless, it should be understood that the invention is not limited in this regard. The host interface 704 may also compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 706 is coupled to the memory management circuit 702 and configured to access the rewritable non-volatile memory module 406. In other words, data to be written into the rewritable non-volatile memory module 406 is converted into a format acceptable by the rewritable non-volatile memory module 406 via the memory interface 706. Specifically, if the memory management circuit 702 intends to access the rewritable non-volatile memory module 406, the memory interface 706 sends corresponding command sequences. For example, the command sequences may include the write command sequence as an instruction for writing data, the read command sequence as an instruction for reading data, the erase command sequence as an instruction for erasing data, and other corresponding command sequences as instructions for performing various memory operations (e.g., changing read voltage levels or performing a garbage collection procedure). These command sequences are generated by the memory management circuit 702 and transmitted to the rewritable non-volatile memory module 406 through the memory interface 706, for example. The command sequences may include one or more signals, or data transmitted in the bus. The signals or the data may include command codes and program codes. For example, information such as identification codes and memory addresses are included in the read command sequence.

The error check and correction circuit 708 is coupled to the memory management circuit 702 and configured to perform an error check and correction operation to ensure integrity of data. Specifically, when the memory management circuit 702 receives the write command from the host system 11, the error check and correction circuit 708 generates an ECC (error correcting code) and/or an EDC (error detecting code) for data corresponding to the write command, and the memory management circuit 702 writes data and the ECC and/or the EDC corresponding to the write command into the rewritable non-volatile memory module 406. Later, when reading the data from the rewritable non-volatile memory module 406, the memory management circuit 702 will read the corresponding ECC and/or the EDC, and the error check and correction circuit 708 will perform the error check and correction operation on the read data based on the ECC and/or the EDC.

In an exemplary embodiment, the memory control circuit unit 404 further includes a buffer memory 710 and a power management circuit 712.

The buffer memory 710 is coupled to the memory management circuit 702 and configured to temporarily store data and commands from the host system 11 or data from the rewritable non-volatile memory module 406. The power management unit 712 is coupled to the memory management circuit 702 and configured to control a power of the memory storage device 10.

In this exemplary embodiment, the error check and correction circuit 708 can perform a single-frame encoding for the data stored in the same physical programming unit and can also perform a multi-frame encoding for data stored in multiple physical programming units. Each of the single-frame encoding and the multi-frame encoding may adopt encoding algorithms including at least one of a LDPC (low density parity code), a BCH code, a convolutional code or a turbo code. Alternatively, in another exemplary embodiment, the multi-frame encoding may also include a RS codes (Reed-solomon codes) algorithm or an XOR (exclusive OR) algorithm. Further, in another exemplary embodiment, more of other encoding algorithms not listed above may also be adopted, which are omitted herein. According to the adopted encoding algorithm, the error check and correction circuit 708 can encode the data to be protected, so as to generate the corresponding ECC and/or the EDC.

It is noted that in the following description, some terms may be replaced with corresponding abbreviations for ease of reading (see Table 1).

TABLE 1

| rewritable non-volatile memory module | RNVM module |
| physical programming unit | PPU |
| physical erasing unit | PEU |
| memory management circuit | MMC |

Figure 7:
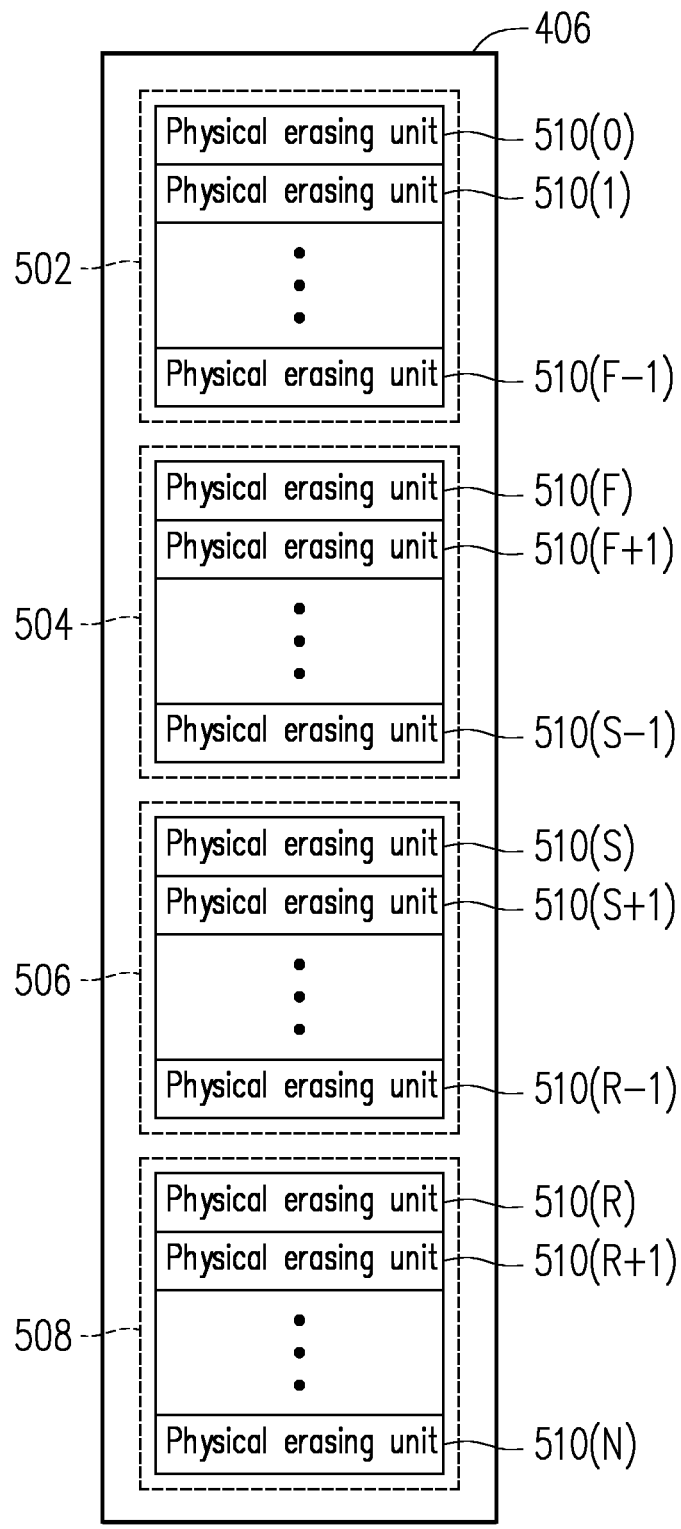
FIG. 7 and FIG. 8 are schematic diagrams illustrating examples of managing the PEUs according to an exemplary embodiment of the present invention.
Figure 8:
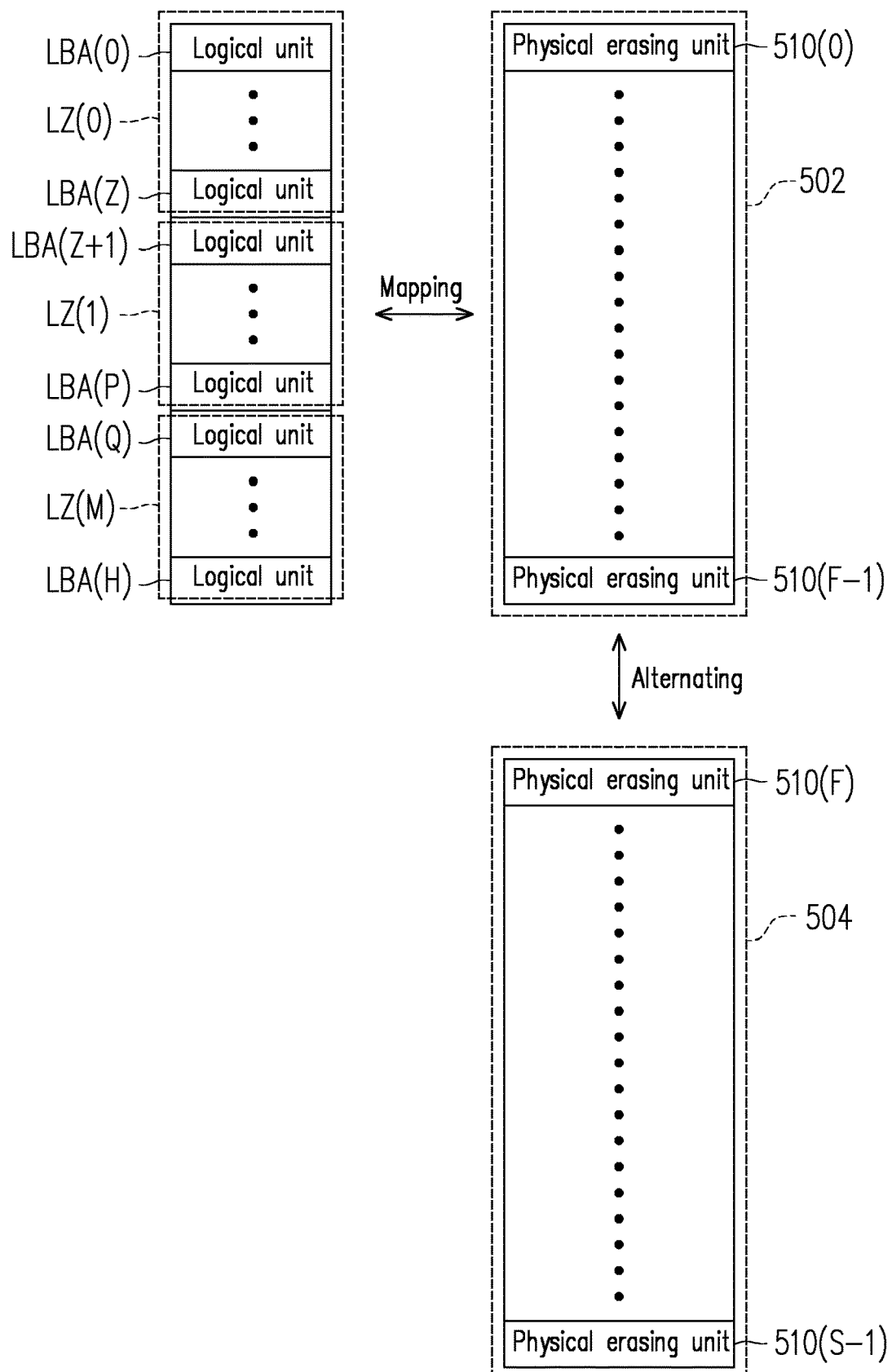

FIG. 7 and FIG. 8 are schematic diagrams illustrating examples of managing the PEUs according to an exemplary embodiment of the present invention.

With reference to FIG. 7, the RNVM module 406 has PEUs 510(0) to 510(N), and the MMC 702 logically partitions the PEUs 510(0) to 510(N) into a data area 502, a free area 504, a temporary area 506 and a replacement area 508. The PEUs logically belonging to the data area 502 and the free area 504 are used for storing data from the host system 11. To be more specific, the PEUs belonging to the data area 502 are regarded as PEUs with data stored therein, and the PEUs belonging to the free area 504 are PEUs in replacement with the data area 502. Namely, when the host system 11 receives a write command and data to be written, the MMC 702 selects a PEU from the free area 504 and writes the data into the selected PEU so as to replace the PEU of the data area 502.

The PEUs logically belonging to the temporary area 506 are used for recording system data. For instance, the system data includes a logical address-physical address mapping table, the manufacturers and models of the RNVM module, the number of physical blocks in the RNVM modules, the number of PPUs of each PEU.

The PEUs logically belonging to the replacement area 508 are used for replacing damaged PEUs. To be more specific, if there are still normal PEUs is the replacement area 508, and a PEU in the data area 502 is damaged, the MMC 302 elects a normal PEU from the replacement area 508 to replace the damaged PEU.

Specially, the number of the PEUs belonging to the data area 502, the free area 504, the temporary area 506 and the replacement area 508 vary with different memory types. Additionally, it is to be understood that in the operation of the memory storage device 10, the PEUs associated with the data area 502, the free area 504, the temporary area 506 and the replacement area 508 are dynamically changed. For instance, when one PEU in the free area 504 is damaged and replaced by a PEU of the replacement area 508, the PEUs originally associated with the replacement area 508 is associated with the free area 504.

With reference to FIG. 8, the MMC 702 configures logical units LBA(0) to LBA(H) for mapping the PEUs belonging to the data area 502, where each logical unit has a plurality of logical sub-units to be mapped to the PPUs of the corresponding PEU. In the meantime, when the host system 11 is to write data into a logical unit or update the data stored in the logical unit, the MMC 702 selects a PEU from the free area 504 for writing data to alternatively replace the PEU of the data area 502. In the present exemplary embodiment, a logical sub-unit may be a logical page or a logical sector.

In order to identify where each logical unit of data is stored in the PEU, in the present exemplary embodiment, the MMC 702 records mapping relations between the logical units and the PEUs. When the host system 11 is about to access data in the logical sub-unit, the MMC 702 confirms the logical unit where the logical sub-units belong to and accesses data from the PEU mapped to the logical unit. For instance, in the present exemplary embodiment, the MMC 702 stores a logical address-physical address mapping table in the RNVM module 406 for recording each PEU mapped to the logical unit. When accessing data, the MMC 702 loads the logical address-physical address mapping table to the buffer memory 710 for updating.

It should be mentioned that the buffer memory 710 may be incapable of recording mapping tables recording the mapping relations of all logical units due to its limited capacity. Therefore, in the present exemplary embodiment, the MMC 702 groups the logical units LBA(0) to LBA(H) into a plurality of logical zones LZ(0) to LZ(M) and assigns one logical address mapping table to each logical zone. Specially, when the MMC 702 is going to update the mapping of a logical unit, the logical address-physical address mapping table corresponding to the logical zone of the logical unit is loaded to the buffer memory buffer memory 710 and is then updated.

In the present embodiment, when the MMC 702 receives a write command (also referred to as a first write command) from the host system 11, the MMC 702 determines whether the number of PEUs (i.e., PEUs available for writing) in the free area 504 is greater than a first threshold. In the present embodiment, the first threshold is, for example, 15. However, the invention is not intended to limit the value of the first threshold.

When the number of PEUs in the free area 504 is greater than the first threshold, the MMC 702 issues a first command sequence to select at least one first PEU from the free area 504, and write data corresponding to the first write command into at least one PPU (also referred to as a first PPU) of the first PEU by using the single page programming mode or the multi-page programming mode. It should be noted that, in this example, when the number of PEUs in the free area 504 is greater than the first threshold, which of the single page programming mode or the multi-page programming mode used by the MMC 702 is determined by the commands issued by the host system 11. The following examples illustrate single-page programming mode and multi-page programming mode.

Figure 9:
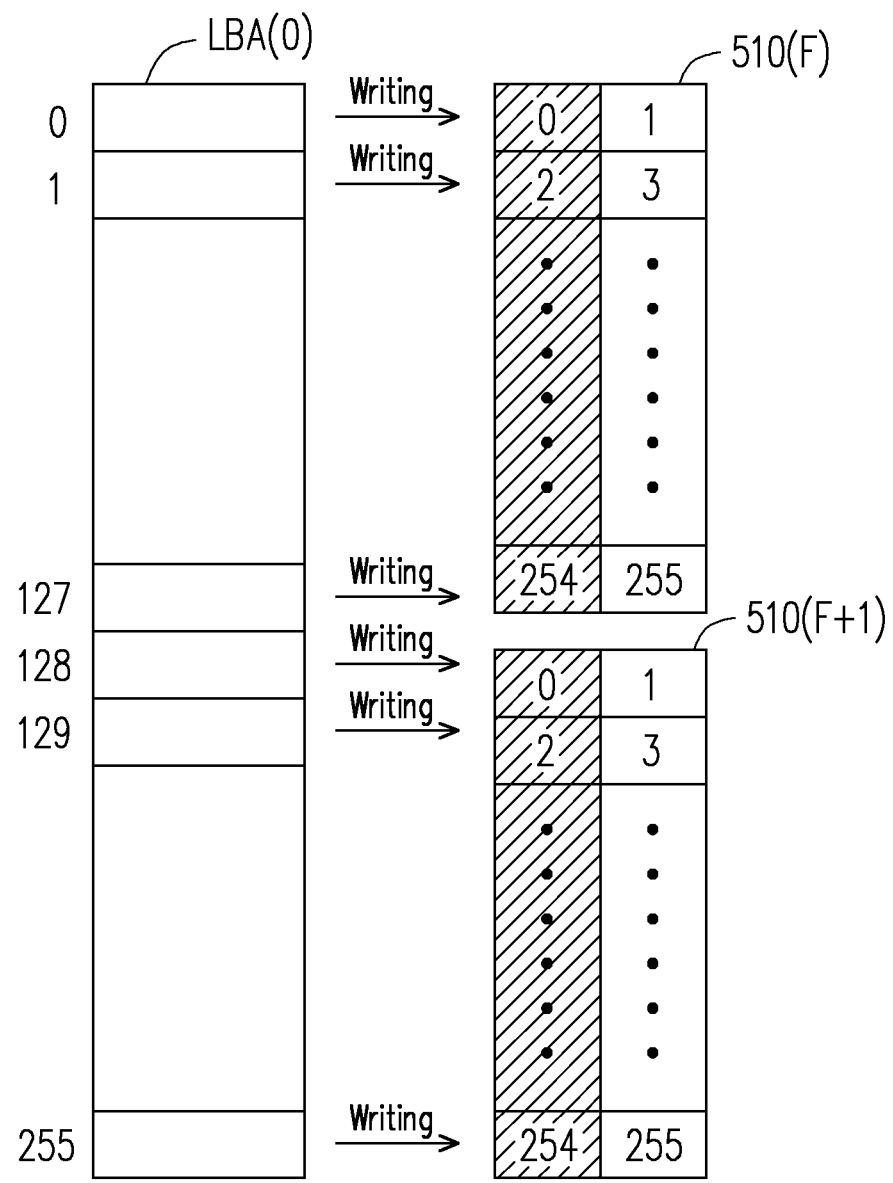
FIG. 9 is a schematic diagram of illustrating examples of writing data into a RNVM module by using a single page programming mode.

FIG. 9 is a schematic diagram of illustrating examples of writing data into a RNVM module by using a single page programming mode.

Assuming that the first write command is to instruct storing the data into the 0th to 255th logical sub-units of the logical unit LBA(0). The MMC 702 first temporarily stores the data of the first write command to the buffer memory 710. Then, referring to FIG. 9, the MMC 702 can extract, for example, two PEUs 510(F) and 510 (F+1) from the free area 504 as multiple active PEUs corresponding to the first write command. Assuming that the MMC 702 performs write operations by using the single page programming mode, the MMC 702 writes the data of the first write command from the buffer memory 710 to the PPUs of the PEU 510(F) and the PEU 510 (F+1) according to the first command sequence. That is, it is assumed that the PEUs 510 (F) and 510(F+1) are the aforementioned first PEU, and the PPUs of the PEUs 510(F) and 510(F+1) are the aforementioned first PPU. Here, since the PEU 510(F) and the PEU 510(F+1) are programmed by the single page programming mode, as described above, the memory cells constituting the PPUs of the PEU 510(F) and the PEU 510 (F+1) are programmed to store 1 bit of data. That is, in the single page programming mode, the lower PPUs of the PEU 510(F) and the PEU 510(F+1) are used to write data and the upper PPUs of the PEU 510(F) and the PEU 510(F+1) are not used to write data.

In detail, as shown in FIG. 9, the MMC 702 may sequentially write the data to be stored into the $0^{th}$ to $127^{th}$ logical sub-units of the logical unit LBA(0) into the lower PPU of the PEU 510(F), and sequentially write the data to be stored into the $128^{th}$ to $255^{th}$ logical subunits of the logical unit LBA(0) into the lower PPU of the PEU 510(F+1). That is, the MMC 702 writes the data corresponding to the first write command into the lower PPU of the PEU 510(F) and the lower PPU of the PEU 510(F+1) of the RNVM module 406 from the buffer memory 710 by using the single page programming mode, the upper PPU of the PEU 510(F) and the upper PPU of the PEU 510(F+1) are not used to write data.

After the operation of writing the data corresponding to the first write command into the lower PPU of the PEU 510(F) and the lower PPU of the PEU 510(F+1) of the RNVM module 406 from the buffer memory 710 by using the single page programming mode, the MMC 702 may associate the PEU 510(F) and the PEU 510(F+1) to the data area 502 and transmit write completion information to the host system 11 in response to the first write command issued by the host system 11.

Figure 10:
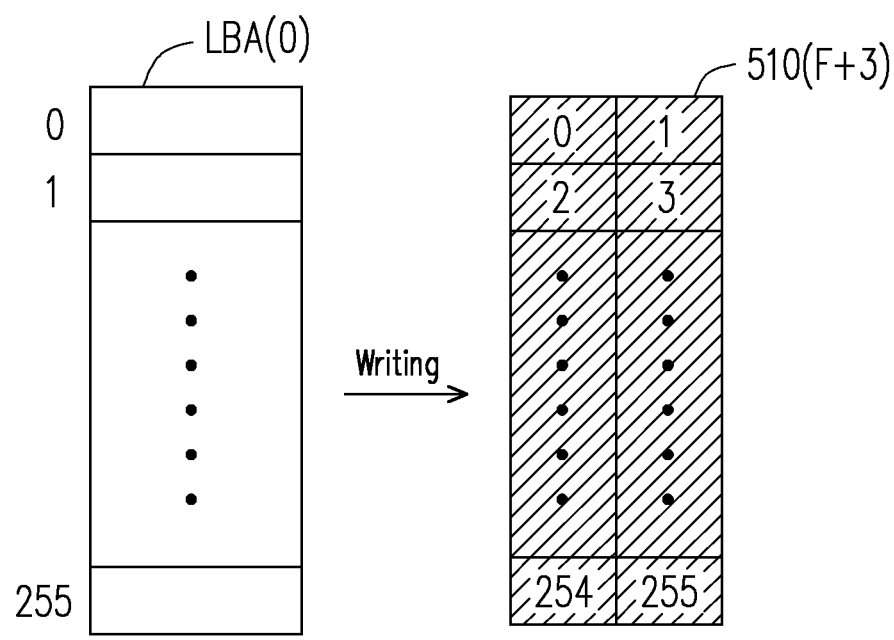
FIG. 10 is a schematic diagram of illustrating examples of writing data into a RNVM module by using a multi-page programming mode.

FIG. 10 is a schematic diagram of illustrating examples of writing data into a RNVM module by using a multi-page programming mode.

Assuming that the first write command is to instruct storing the data into the 0th to 255th logical sub-units of the logic unit LBA(0), the MMC 702 first temporarily stores the data of the first write command to the buffer memory 710. Thereafter, referring to FIG. 10, the MMC 702 can extract, for example, one PEU 510 (F+3) from the free area 504 as an active PEU corresponding to the first write command. Assuming that the MMC 702 performs write operations by using the multi-page programming mode, the MMC 702 writes the data of the first write command from the buffer memory 710 to the PPUs of the PEU 510(F+3) according to the first command sequence. That is, it is assumed that the PEU 510(F+3) is the aforementioned first PEU and the PPUs of the PEU 510(F+3) is the aforementioned first PPU. Here, since the PEU 510(F+3) is programmed by using the multi-page programming mode, as described above, the memory cells constituting the PPUs of the PEU 510(F+3) are programmed to store multiple bits of data. That is, in the multi-page programming mode, both the lower PPU and the upper PPU of the PEU 510(F+3) are used to write data.

In detail, as shown in FIG. 10, the MMC 702 may sequentially write the data to be stored into the $0^{th}$ to $255^{th}$ logical sub-units of the logical unit LBA(0) into the lower PPU and upper PPU of the PEU 510(F+3). That is, the MMC 702 writes the data corresponding to the first write command into the lower PPU and the upper PPU of the PEU 510(F+3) of the RNVM module 406 from the buffer memory 710 by using the multi-page programming mode.

After the operation of writing the data corresponding to the first write command into the lower PPU and the upper PPU of the PEU 510(F+3) of the RNVM module 406 from the buffer memory 710 by using the multi-page programming mode, the MMC 702 may associate the PEU 510(F+3) to the data area 502 and transmit write completion information to the host system 11 in response to the first write command issued by the host system 11.

In particular, in the present embodiment, when the MMC 702 receives the first write command from the host system 11 and the MMC 702 determines that the PEU in the free area 504 is not greater than the first threshold, the MMC 702 will issue a second command sequence to select at least one PEU (referred to as a second PEU) from the free area 504, and only use the single page programming mode to write the data corresponding to the first write command to at least one PPU (also referred to as a second PPU) of the second PEU without using the multi-page programming mode. How to perform write operations by using the single page programming mode has been described in detail as before, and will not be described here.

Thereafter, the MMC 702 determines whether the number of PEUs (i.e., PEUs available for writing) in the free area 504 is not greater than a second threshold. In particular, the second threshold is smaller than the first threshold.

When the number of PEUs (i.e., PEUs available for writing) in the free area 504 is not greater than the second threshold, the MMC 702 may perform a valid data merging operation to copy a plurality of valid data written by using the single page programming mode to a plurality of PPUs (also referred to as a third PPU) of another PEU (also referred to as a third PEU) in the free area 504. In other words, by the mechanism that the second threshold is less than the first threshold, it can be ensured that the MMC 702 performs write operations by using the single page programming mode before performing the valid data merging operation.

The following example illustrates a valid data merging operation.

Figure 11:
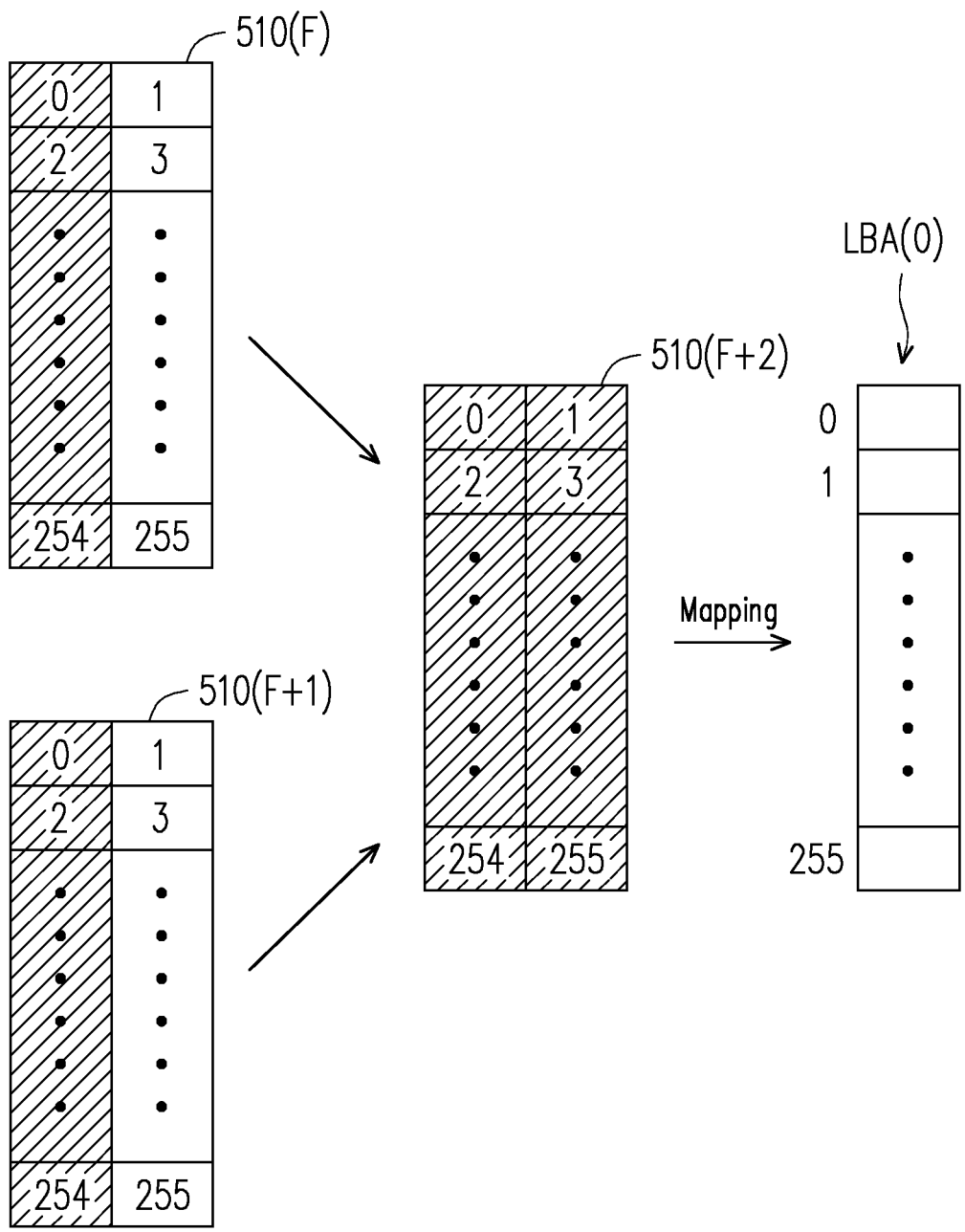
FIG. 11 is a schematic diagram of performing a valid data merging operation on data written in a single page programming mode by using a multi-page programming mode according to an example.

FIG. 11 is a schematic diagram of performing a valid data merging operation on data written in a single page programming mode by using a multi-page programming mode according to an example.

Assuming that the PEU 510(F) and the PEU 510(F+1) of the logical unit LBA(0) has stored valid data of all logical sub-units of the logical unit LBA(0) (as shown in FIG. 9). When the number of empty PEUs in the free area 504 is smaller than a preset threshold, the MMC 702 may perform the valid data merging operation.

In detail, when the number of empty PEUs in the free area 504 is smaller than a preset threshold, the MMC 702 may perform the valid data merging operation. Referring to FIG. 11, when the MMC 702 performs the valid data merging operation, the the MMC 702, for example, selects one PEU from the free area 504 as PEU 510(F+2) (hereinafter referred to as third PEU) for substitution. Specifically, the MMC 702 selects one blank PEU or one PEU in which the data stored is invalid. Especially, if the selected PEU is the PEU with invalid data, the MMC 702 may first perform an erase operation to the PEU. In other words, the invalid data of the PEU should be erased at first.

Afterwards, the MMC 702 copies a plurality of valid data of the PEU 510(F) and the PEU 510(F+1) into PPUs of the PEU 510(F+2) of the RNVM module 406 by using the multi-page programming mode. Herein, the PEU 510(F+2) is programmed by the multi-page programming mode. Accordingly, each memory cell constituting the PPUs of the PEU 510(F+2) is programmed to store multiple bits of data as mentioned above. That is, in the multi-page programming mode, both the lower PPU of the PEU 510(F+2) and the upper PPU of the PEU 510(F+2) are used to write data.

In detail, the MMC 702 may write (or copy) the valid data belonging to the $0^{th}$ to $127^{th}$ logical sub-units of the logical unit LBA(0) into the corresponding pages of the PEU 510(F+2) (e.g., the $0^{th}$ to $127^{th}$ PPUs). After that, the MMC 702 may copy the valid data belonging to the $128^{th}$ to $255^{th}$ logical sub-units of the logical unit LBA(0) into the corresponding pages of the PEU 510(F+2) (e.g., the $128^{th}$ to $255^{th}$ PPUs). That is, in the multi-page programming mode, the $0^{th}$ to $255^{th}$ PPUs (i.e., the third PPU as mentioned above) of the PEU 510(F+2) are used to write data.

That is, when performing the valid data merging operation, the PEU to be associated to the data area 502 is operated by using the multi-page programming mode. Accordingly, PPU groups are taken as units of writing data into the PEU 510(F+2) simultaneously or periodically. Specifically, in one exemplary embodiment, the $0^{th}$ and the $1^{st}$ PPUs of the PEU 510(F+2) are programmed simultaneously so as to be written in the data of the $0^{th}$ and the $1^{st}$ logical sub-units of the logical unit LBA(0). The $2^{nd}$ and the $3^{rd}$ PPUs of the PEU 510(F+2) are programmed simultaneously so as to be written in the data of the $2^{nd}$ and the $3^{rd}$ logical sub-units of the logical unit LBA(0). And, it can be deduced that the data of the other logical subunits are written into the PEU 510(F+2) in units of the PPU groups.

At last, the MMC 702 may map the logical unit LBA(0) to the PEU 510(F+2), perform an erasing operation to the PEUs 510(F)~510(F+1) and re-associate the PEUs 510(F)~510(F+1) to the free area 504. That is, when executing the subsequent write commands, the erased PEUs 510(F)~510(F+1) can be again selected as the active PEU of the logical unit to be written.

By performing the valid data merging operation aforementioned, it can be assured that the available storage capacity of the RNVM module 406 does not reduce due to being written by using the single page programming mode previously.

It should be noted that the foregoing valid data merging operation is described by taking the first PEU written by using the single page programming mode as an example. However, the present invention is not limited thereto, the foregoing valid data merging operation may be used alone or in combination in the first PEU and the second PEU written by using the single page programming mode.

In particular, it is assumed that an abnormal power-off is occurred during the MMC 702 writing to the RNVM module 406. When the RNVM module is powered back on, the MMC 702 needs to perform an error recovery mechanism.

For example, in an embodiment, when the connection interface unit 402 (or the host interface 704) receives the first write command from the host system 11 and the MMC 702 determines that the number of the PEUs in the free area 504 is not greater than the first threshold, the MMC 702 may write the data corresponding to the first write command to the second PPU of the second PEU described above by using the single page programming mode. It is assumed that RNVM module 406 occurs an abnormal power-off during performing the writing operation to the second PPU. After powering back on, the MMC 702 would copy the valid data in the second PEU to at least one PPU (also referred to as a fourth PPU) of another PEU (also referred to as a fourth PEU) by using the single page programming mode to complete the error recovery mechanism. When the copy operation is completed, the MMC 702 will reply an information of a ready state to the host system 11. It is worth mentioning that in the present embodiment, the error recovery mechanism performed by the abnormal power-off is to move (or copy) the data stored in the single page programming mode to another PEU by using the single page programming mode, an operation speed of the aforementioned mechanism is faster than an operation speed of moving (or copying) the data stored in the multi-page programming mode to another PEU by using the multi-page programming mode.

In another embodiment, the error recovery mechanism performed due to the power-off can also be accomplished through the valid data merging operation. In detail, when the connection interface unit 402 (or the host interface 704) receives the first write command from the host system 11 and the MMC 702 determines that the number of the PEU in the free area 504 is not greater than the first threshold, the MMC 702 may write the data corresponding to the first write command to the second PPU of the second PEU described above by using the single page programming mode. It is assumed that during the process of writing the second PEU, the RNVM module 406 is abnormally powered off. After the power is turned back on, the MMC 702 will immediately returned information of the ready state to the host system 11. Thereafter, the MMC 702 can determine whether the number of PEUs available for writing in the free area 504 is not greater than the second threshold. When the number of PEUs available for writing in the free area 504 is not greater than the second threshold, it represents that the number of PEUs available for writing in the free area 504 is insufficient. At this time, the MMC 702 can move (or copy) the data written in the single page programming mode in the second PEU to another PEU by using the multi-page programming mode, and the second PEU is again associated to the free area 504. Thereby, the number of PEUs available for writing in the free area 504 can be increased and the error recovery mechanism performed due to the power-off can be completed. It is worth mentioning that, in the present embodiment, the valid data merging operation performed after the abnormal power-off is to move (or copy) the data stored in the single page programming mode to another PEU by using the multi-page programming mode to obtain a PEU available for writing, and the execution speed of the aforementioned mechanism is faster than the speed of a general valid data merging operation that moving (or copying) the data stored in the multi-page programming mode to another PEU by using the multi-page programming mode.

It should be noted that the foregoing example is taken the MLC NAND type flash memory module (i.e., a flash memory module capable of storing 2 bits of data in a memory cell) as an example. However, the present invention is not limited thereto. In other embodiments, the data writing method of the present invention can also be applied to a TLC NAND type flash memory module, other flash memory module or other memory module with the same characteristics.

Figure 12:
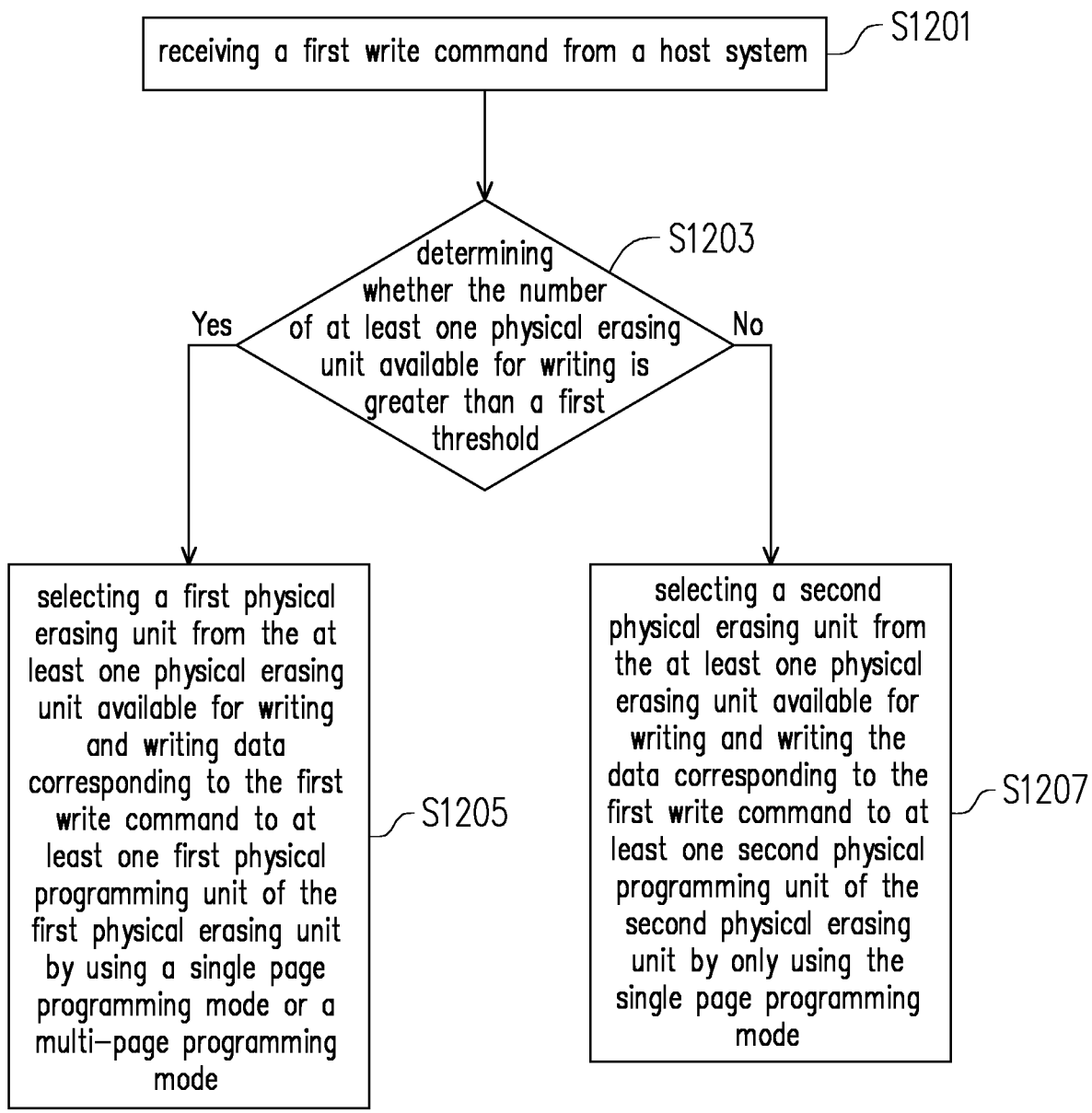
FIG. 12 is a flow chart of a data writing method according to an example.

FIG. 12 is a flow chart of a data writing method according to an example.

Referring to FIG. 12, in step S1201, the connection interface unit 402 (or the host interface 704) receives a first write command from the host system 11. In step S1203, the MMC 702 determines whether the number of PEUs available for writing is greater than the first threshold. When the number of PEUs available for writing is greater than the first threshold, in step S1205, the MMC 702 issues a first command sequence to select a first PEU from the PEUs available for writing and write the data corresponding to the first write command to the first PPU of the first PEU by using the single page programming mode or the multi-page programming mode. In addition, when the number of PEUs available for writing is not greater than the first threshold, in step S1207, the MMC 702 issues a second command sequence to select a second erasing unit from the PEU available for writing and write and the data corresponding to the first write command to the second PPU of the second PEU by only using the single page programming mode.

In summary, the data writing method, the memory control circuit unit, and the memory storage device of the present invention can perform the error recovery mechanism quickly in response to an abnormal power-off of the RNVM module after the power is back on.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A data writing method for a rewritable non-volatile memory module, wherein the rewritable non-volatile memory module comprises a plurality of physical erasing units, each of the plurality of physical erasing units comprises a plurality of physical programming units, the data writing method comprising:
grouping the physical erasing units into at least a data area and a free area, wherein the physical erasing units of the free area are physical erasing units empty and available for writing, which are in replacement with the physical erasing units of the data area;
receiving a first write command from a host system;
determining whether the number of physical erasing units of the free area is greater than a first threshold;
selecting a first physical erasing unit from the free area and writing data corresponding to the first write command to at least one first physical programming unit of the first physical erasing unit by using a single page programming mode or a multi-page programming mode in response to a determination result indicating the number of the physical erasing units of the free area is greater than the first threshold; and
selecting a second physical erasing unit from the free area and writing the data corresponding to the first write command to at least one second physical programming unit of the second physical erasing unit by only using the single page programming mode in response to a determination result indicating the number of the physical erasing units of the free area is not greater than the first threshold.

2. The data writing method as claimed in claim 1, further comprising:
   determining whether the number of the physical erasing units of the free area is not greater than a second threshold; and
   when the number of the physical erasing units of the free area is not greater than the second threshold, performing a valid data merging operation,
   wherein the second threshold is smaller than the first threshold.

3. The data writing method as claimed in claim 2, wherein the step of performing the valid data merging operation comprises:
   copying, by using the multi-page programming, a plurality of valid data written in the single page programming mode to a plurality of third physical programming units of a third physical erasing unit selected from the free area.

4. The data writing method as claimed in claim 2, further comprising:
   when the rewritable non-volatile memory module is abnormally powered off and powered back on, performing the step of determining whether the number of the physical erasing units in the free area is not greater than the second threshold.

5. The data writing method as claimed in claim 1, wherein the step of writing the data corresponding to the first write command to the at least one second physical programming unit of the second physical erasing unit by using the single page programming mode comprises:
   after the rewritable non-volatile memory module is powered off and powered back on, copying a plurality of valid data in the second physical erasing unit to at least one fourth physical programming unit of a fourth physical erasing unit selected from the free area by using the single page programming mode.

6. The data writing method as claimed in claim 1, wherein the first threshold is 15 physical erasing units.

7. The data writing method as claimed in claim 1, wherein
   the first physical programming unit is constituted by a plurality of first memory cells and the second physical programming unit is constituted by a plurality of second memory cells,
   in the single page programming mode, each of the plurality of first memory cells constituting the first physical programming unit and each of the plurality of second memory cells constituting the second physical programming unit stores only one bit of data, and
   in the multi-page programming mode, each of the plurality of first memory cells constituting the first physical programming unit stores multiple bits of data.

8. A memory control circuit unit for controlling a rewritable non-volatile memory module, the memory control circuit unit comprising:
   a host interface configured to couple to a host system;
   a memory interface configured to couple to the rewritable non-volatile memory module, wherein the rewritable non-volatile memory module comprises a plurality of physical erasing units, and each of the physical erasing units comprises a plurality of physical programming units; and
   a memory management circuit coupled to the host interface and the memory interface,
   wherein the memory management circuit is configured to group the physical erasing units into at least a data area and a free area, wherein the physical erasing units of the free area are physical erasing units empty and available for writing, which are in replacement with the physical erasing units of the data area,
   wherein the memory management circuit is further configured to receive a first write command from the host system,
   wherein the memory management circuit is further configured to determine whether the number of the physical erasing units of the free area is greater than a first threshold,
   the memory management circuit is further configured to issue a first command sequence to select a first physical erasing unit from the free area and write data corresponding to the first write command to at least one first physical programming unit of the first physical erasing unit by using a single page programming mode or a multi-page programming mode in response to a determination result indicating the number of the physical erasing units of the free area is greater than the first threshold,
   the memory management circuit is further configured to issue a second command sequence to select a second physical erasing unit from the free area and write the data corresponding to the first write command to at least one second physical programming unit of the second physical erasing unit by only using the single page programming mode in response to a determination result indicating the number of the physical erasing units of the free area is not greater than the first threshold.

9. The memory control circuit unit as claimed in claim 8, wherein
   the memory management circuit is further configured to determine whether the number of the physical erasing units of the free area is not greater than a second threshold, and
   when the number of the physical erasing units of the free area is not greater than the second threshold, the memory management circuit is further configured to perform a valid data merging operation,
   wherein the second threshold is smaller than the first threshold.

10. The memory control circuit unit as claimed in claim 9, wherein in the operation of performing the valid data merging operation,
    the memory management circuit is further configured to copy, by using the multi-page programming, a plurality of valid data written in the single page programming mode to a plurality of third physical programming units of a third physical erasing unit selected from the free area.

11. The memory control circuit unit as claimed in claim 9, wherein
    when the rewritable non-volatile memory module is abnormally powered off and powered back on, the memory management circuit is further configured to perform the operation of determining whether the number of the physical erasing units of the free area is not greater than the second threshold.

12. The memory control circuit unit as claimed in claim 8, wherein in the operation of writing the data corresponding to the first write command to the at least one second physical programming unit of the second physical erasing unit by using the single page programming mode, after the rewritable non-volatile memory module is powered off and powered back on, the memory management circuit is further configured to copy a plurality of valid data in the second physical erasing unit to at least one fourth physical programming unit of a fourth physical erasing unit selected from the free area by using the single page programming mode.

13. The memory control circuit unit as claimed in claim 8, wherein the first threshold is 15 physical erasing units.

14. The memory control circuit unit as claimed in claim 8, wherein
the first physical programming unit is constituted by a plurality of first memory cells and the second physical programming unit is constituted by a plurality of second memory cells,
in the single page programming mode, each of the plurality of first memory cells constituting the first physical programming unit and each of the plurality of second memory cells constituting the second physical programming unit stores only one bit of data, and
in the multi-page programming mode, each of the plurality of first memory cells constituting the first physical programming unit stores multiple bits of data.

15. A memory storage device, comprising:
a connection interface unit configured to couple to a host system;
a rewritable non-volatile memory module comprising a plurality of physical erasing units, and each of the physical erasing units comprising a plurality of physical programming units; and
a memory control circuit unit coupled to the connection interface unit and the rewritable non-volatile memory module,
wherein the memory control circuit unit is configured to group the physical erasing units into at least a data area and a free area, wherein the physical erasing units of the free area are physical erasing units empty and available for writing, which are in replacement with the physical erasing units of the data area,
wherein the memory control circuit unit is further configured to receive a first write command from the host system,
wherein the memory control circuit unit is further configured to determine whether the number of the physical erasing units of the free area is greater than a first threshold,
the memory control circuit unit is further configured to issue a first command sequence to select a first physical erasing unit from the free area and write data corresponding to the first write command to at least one first physical programming unit of the first physical erasing unit by using a single page programming mode or a multi-page programming mode in response to a determination result indicating the number of the physical erasing units of the free area is greater than the first threshold, and
the memory control circuit unit is further configured to issue a second command sequence to select a second physical erasing unit from the free area and write the data corresponding to the first write command to at least one second physical programming unit of the second physical erasing unit by only using the single page programming mode in response to a determination result indicating the number of the physical erasing units of the free area is not greater than the first threshold.

16. The memory storage device as claimed in claim 15, wherein
the memory control circuit unit is further configured to determine whether the number of the physical erasing units of the free area is not greater than a second threshold, and
when the number of the physical erasing units of the free area is not greater than the second threshold, the memory control circuit unit is further configured to perform a valid data merging operation,
wherein the second threshold is smaller than the first threshold.

17. The memory storage device as claimed in claim 16, wherein in the operation of performing the valid data merging operation,
the memory control circuit unit is further configured to copy, by using the multi-page programming, a plurality of valid data written in the single page programming mode to a plurality of third physical programming units of a third physical erasing unit selected from the free area.

18. The memory storage device as claimed in claim 16, wherein
when the rewritable non-volatile memory module is abnormally powered off and powered back on, the memory control circuit unit is further configured to perform the operation of determining whether the number of the physical erasing units of the free area is not greater than the second threshold.

19. The memory storage device as claimed in claim 15, wherein in the operation of writing the data corresponding to the first write command to the at least one second physical programming unit of the second physical erasing unit by using the single page programming mode,
after the rewritable non-volatile memory module is powered off and powered back on, the memory control circuit unit is further configured to copy a plurality of valid data in the second physical erasing unit to at least one fourth physical programming unit of a fourth physical erasing unit selected from the free area by using the single page programming mode.

20. The memory storage device as claimed in claim 15, wherein the first threshold is 15 physical erasing units.

21. The memory storage device as claimed in claim 15, wherein
the first physical programming unit is constituted by a plurality of first memory cells and the second physical programming unit is constituted by a plurality of second memory cells,
in the single page programming mode, each of the plurality of first memory cells constituting the first physical programming unit and each of the plurality of second memory cells constituting the second physical programming unit stores only one bit of data, and
in the multi-page programming mode, each of the plurality of first memory cells constituting the first physical programming unit stores multiple bits of data.

* * * * *